United States Patent
Reesh et al.

(12)

(10) Patent No.: US 7,337,413 B1
(45) Date of Patent: Feb. 26, 2008

(54) METHOD AND SYSTEM FOR CUSTOM BOUQUET DESIGN

(75) Inventors: Laurie A. Reesh, Jacksonville, FL (US); Jorel Vaccaro, Gainesville, FL (US); Amanda Knight, Ponte Vedra, FL (US)

(73) Assignee: I Do and So Can You, Inc., Jacksonville, FL (US)

( * ) Notice: Subject to any disclaimer, the term of this patent is extended or adjusted under 35 U.S.C. 154(b) by 535 days.

(21) Appl. No.: 10/985,651

(22) Filed: Nov. 10, 2004

(51) Int. Cl.
*G06F 3/00* (2006.01)
*G09B 25/08* (2006.01)

(52) U.S. Cl. ........................... 715/962; 434/93
(58) Field of Classification Search ............. 715/962; 705/26; 434/93
See application file for complete search history.

(56) References Cited

U.S. PATENT DOCUMENTS

| | | | |
|---|---|---|---|
| 4,606,950 A | 8/1986 | Corbet | |
| 4,910,661 A | 3/1990 | Barth et al. | |
| 5,440,479 A * | 8/1995 | Hutton | 705/26 |
| 5,453,308 A * | 9/1995 | Myers | 428/24 |
| 5,495,568 A | 2/1996 | Beavin | |
| 6,034,698 A | 3/2000 | Yasuda | |
| 6,083,267 A | 7/2000 | Motomiya et al. | |
| 2002/0068262 A1* | 6/2002 | Robinson | 434/93 |

OTHER PUBLICATIONS

Mellisa Flohn Graphware INC Wonderful Weddings Software Provided by the wayback machine date range of Apr. 8, 2002-Sep. 16, 2002.*

Kayo Suzuki, Xinlei Wang, Hiroaki Ikeda An Artistic Design System for Industrial Product Image Retrieval IEEE Industry Application Magazine Jan./Feb. 2002 pp. 29-36.*

* cited by examiner

*Primary Examiner*—William Bashore
*Assistant Examiner*—Andrea Long
(74) *Attorney, Agent, or Firm*—Christine Q. McLeod; Beusse Wolter Sanks Mora & Maire

(57) ABSTRACT

A system, method, computer program, and online computer site is provided for designing and displaying a realistic bouquet from selected images and/or photographs to allow viewing of a custom designed bouquet thereby facilitating the selection process for bouquets, especially wedding bouquets and communicating this selection to a florist Preferably, the invention is operated in conjunction with an interactive web site or stand alone software program.

9 Claims, 5 Drawing Sheets

METHOD AND SYSTEM FOR CUSTOM BOUQUET DESIGN

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to a system and method of custom computerized bouquet design and an online computer site therefor. Specifically, the invention relates to a system, method, and online computer site for designing and displaying a realistic bouquet from selected images and/or photographs to allow viewing of a custom designed bouquet thereby facilitating the selection process for bouquets, especially wedding bouquets.

BACKGROUND OF THE INVENTION

Bridal and wedding bouquets generally consist of a mixture of flowers and different kinds of greenery. Bouquets can be designed to comprise different shapes to create texture and drama in the arrangement. Often an interesting flower arrangement results from the selection of flowers and greenery. Wedding flowers can vary according to the season, trends, or a particular style. In addition to bouquets, there are reception centerpieces filled with an arrangement of flowers and greenery, which accompanies the bridal bouquet.

Many brides become frustrated in choosing wedding flowers since the possibilities are endless for designing a bouquet for a wedding. Brides usually page through hundreds of sample pictures of bouquets looking for ones that they like. After selecting various flowers and greenery from these pictures, the bride still cannot see her selection without making a sample bouquet from fresh flowers, which can be time consuming and expensive, especially if the bride has not yet made up her mind or changes her mind.

Therefore, there is a need in the art for a method by which brides can easily select and visualize different flower arrangements for their wedding. There is also a need in the art for a method of communicating to a florist the bride's selection so that the actual bouquet of fresh flowers resembles the arrangement previously chosen by the bride.

BRIEF SUMMARY OF THE INVENTION

The present invention solves the above-stated problems in the art by providing a system, method, and online computer site for designing and displaying a realistic bouquet from selected images and/or photographs to allow viewing of a custom designed bouquet thereby facilitating the selection process for bouquets, especially wedding bouquets and communicating this selection to a florist.

Features of the invention can be implemented in numerous ways, including as a system, a method, a computer site, or a computer readable medium (e.g., software program). The invention preferably relies on a communications infrastructure, for example the Internet, wherein individual interaction is possible. Several embodiments of the invention are discussed below.

As a computer system, part of the invention generally includes a database and a processor unit. The processor unit operates to provide selections from the database of flowers, greenery, and the like to the bride in an organized, user-friendly manner so that the bride may select and visualize her selections. Moreover, the output may include print or electronic media.

Part or all of the data can also be sent electronically and maintained on a web server for confidential access with typical browsers. The data may also be transmitted and viewed by other well-known techniques such as email, interactive television, and the like. The computer site is preferably viewed with a client web browser through a web secure server communicating with an application server having a database associated therewith.

As a computer readable medium containing program instructions for bouquet selection, an embodiment of the invention includes computer readable code devices for interacting with a consumer/bride as noted above, processing that data, and generating printed or electronic media for that consumer.

Specifically, the method for designing a bouquet via a graphical user interface includes providing an interactive area and a display area of the graphical user interface, wherein the interactive area comprises selectable bouquet item icons for allowing a user to select respective different bouquet items to be displayed in the display area; receiving at least one bouquet item selected by a user responsive to the user selecting a corresponding bouquet item icon wherein the bouquet item comprises at least one of a bouquet style item, a bouquet greenery item, a bouquet flower item, or a bouquet decorative item; displaying a bouquet design image in the display area comprising the selected bouquet item; and updating the bouquet design image in the display area for each bouquet item selected.

The method further includes generating electronic media comprising information corresponding to the bouquet design image and communicating the electronic media to a florist for creation of an actual bouquet corresponding to the bouquet design image. Printed media may also be generated comprising an image of the bouquet design. The printed media may be taken to a florist for creation of an actual bouquet corresponding to the bouquet design image.

Among the features of the invention, the selectable bouquet style item includes at least one of an assortment of bouquet style items. The selectable bouquet greenery item includes at least one of an assortment of bouquet greenery items. The selectable bouquet flower item includes at least one of an assortment of bouquet flower items. The bouquet flower item further includes a selectable bouquet flower color item.

The user can de-select items by de-selecting a corresponding bouquet item icon. The de-selected item is removed from the bouquet design image in the display area for each bouquet item de-selected.

The bouquet design image is displayed in the display area by arranging the selected item in a predetermined manner to limit obstruction of a previously selected item.

As a computer system for designing a bouquet via a graphical user interface, a preferred embodiment of the invention includes a graphical user interface comprising an interactive area and a display area, wherein the interactive area comprises selectable bouquet item icons for allowing a user to select respective different bouquet items to be displayed in the display area; a database for storing bouquet items to be displayed with the image of the bouquet, the items linked to respective icons; and a processor responsive to selection of an icon for retrieving the corresponding selected bouquet item from the database and arranging the selected bouquet item for display with the image of the bouquet in a predetermined manner to limit obstruction of a previously selected item.

As a computer readable media containing program instructions for designing a bouquet via a graphical user interface, an embodiment of the invention includes computer instructions for providing an interactive area and a display area of the graphical user interface, wherein the interactive area comprises selectable bouquet item icons for allowing a user to select respective different bouquet items to be displayed in the display area; computer instructions for receiving at least one bouquet item selected by a user responsive to the user selecting a corresponding bouquet item icon wherein the bouquet item comprises at least one of a bouquet style item, a bouquet greenery item, a bouquet flower item, or a bouquet decorative item; computer instructions for displaying a bouquet design image in the display area comprising the selected bouquet item; and computer instructions for updating the bouquet design image in the display area for each bouquet item selected.

The advantages of the invention are numerous. First and foremost, the invention provides for a method by which consumers can easily construct and view a variety of custom bouquets without having to create actual samples using fresh flowers. A resulting advantage is the ability to quickly change selections and designs. Finally, the output provides a means for communicating the design to a florist for creation of the actual bouquet.

Other aspects and advantages of the invention will become apparent from the following detailed description taken in conjunction with the accompanying drawings, illustrating by way of example the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification. The following patents are incorporated by reference: U.S. Pat. Nos. 4,606,950; 4,910,661; 5,440,479; 5,495,568; 6,034,698; 6,083,267.

BRIEF DESCRIPTION OF THE DRAWINGS

The present invention together with the above and other objects and advantages may best be understood from the following detailed description of the preferred embodiments of the invention illustrated in the drawings, wherein.

Figure 1:
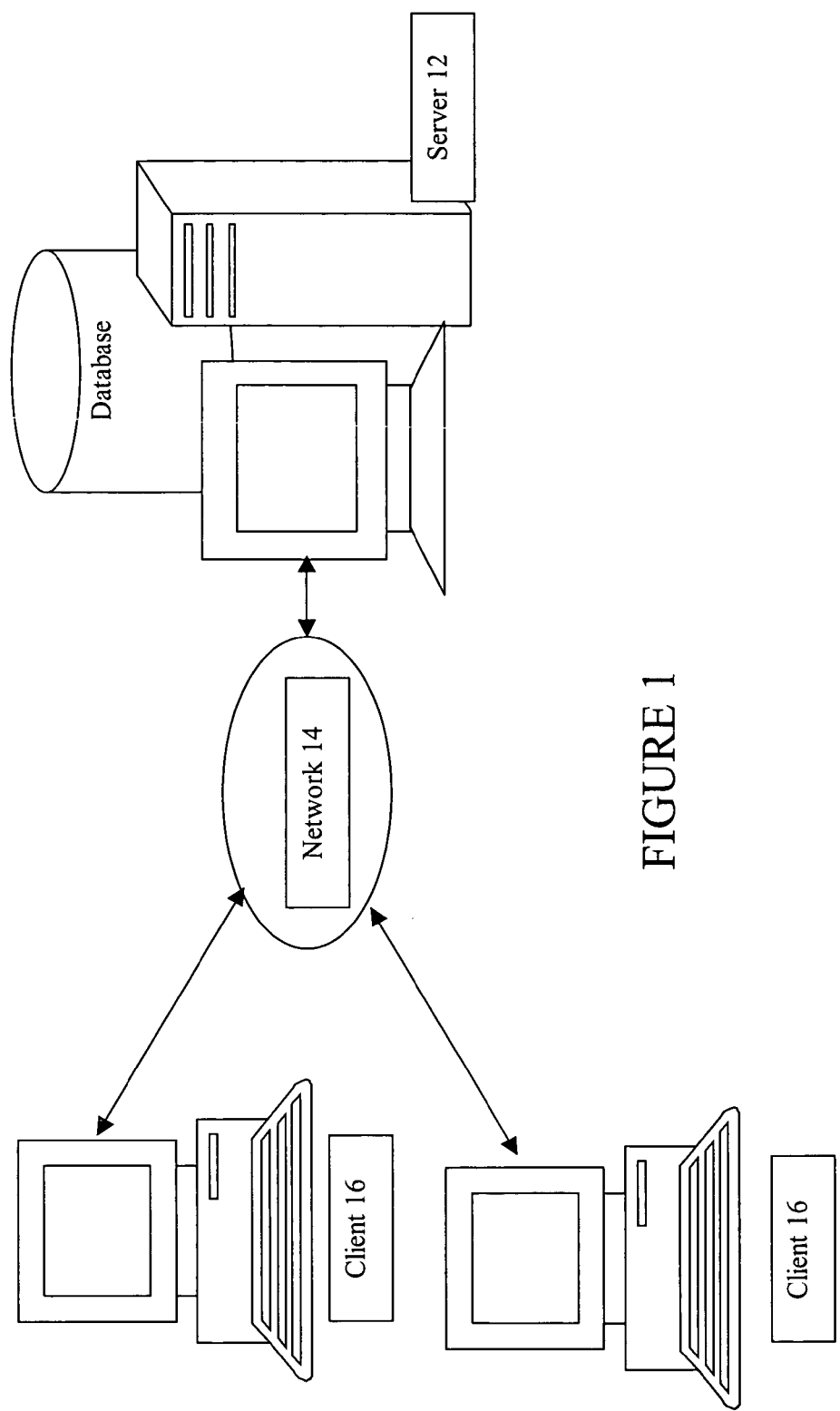
FIG. 1 shows a high level diagram of an exemplary computing system network on which the present invention may be implemented.

It should be understood that in certain situations for reasons of computational efficiency or ease of maintenance, the ordering of the blocks of the illustrated flow charts could be rearranged or moved inside or outside of the illustrated loops by one skilled in the art. While the present invention will be described with reference to the details of the embodiments of the invention shown in the drawing, these details are not intended to limit the scope of the invention.

DETAILED DISCLOSURE OF THE INVENTION

Reference will now be made in detail to the embodiments consistent with the invention, examples of which are illustrated in the accompanying drawings. Wherever possible, the same reference numerals used throughout the drawings refer to the same or like parts.

The present invention solves the problems in the art by providing a system, method, and online computer site for designing and displaying a realistic bouquet from selected images and/or photographs to allow viewing of a custom designed bouquet thereby facilitating the selection process for bouquets, especially wedding bouquets and communicating this selection to a florist Preferably, the invention is operated in conjunction with an interactive web site or stand alone software program.

One of the more significant developments in the consumer industry in the last few years has been the embracing of the Internet by consumers in all aspects of their lives, from research to purchasing. With the Internet, a consumer, equipped with an appropriately connected computer and a browser, can explore vast amounts of information stored on computers around the world. Navigating (surfing) the Internet/Web is relatively simple, typically requiring only clicking a computer mouse to move between Web documents, even when the documents are located at separate locations.

HTML (Hypertext Markup Language) is one of the languages used to provide information on the Web. HTML provides a rich lexicon and syntax for designing and creating useful hypertext and hypermedia documents. With HTML, Web designers can describe the format and content of a Web document, which may include, for example, text filed, graphics files, and multimedia files. When accessed by a client computer (i.e., the computer local to the browser), the HTML file is transmitted to the client computer over a network such as the Internet and interpreted by the browser.

Users typically interact with computers and pages on the Internet with Graphical User Interfaces (GUIs). A conventional GUI display includes a desktop metaphor upon which one or more icons, application windows, or other graphical objects are displayed. Typically, a data processing system user interacts with a GUI display utilizing a graphical pointer, which the user controls with a graphical pointing device, such as a mouse, trackball, or joystick. For example, depending upon the actions allowed by the active application or operating system software, the user can select icons or other graphical objects within the GUI display by positioning the graphical pointer over the graphical object and depressing a button associated with the graphical pointing device. In addition, the user can typically relocate icons, application windows, and other graphical objects on the desktop utilizing the well-known drag-and-drop techniques. By manipulating the graphical objects within the GUI display, the user can control the underlying hardware devices and software objects represented by the graphical objects in a graphical and intuitive manner.

A number of software platforms have been developed for multimedia graphical user interfaces for the Web. For example, Macromedia Flash® is a multimedia interface that lets designers and developers integrate video, text, audio, and graphics into effective experiences. Web designers use Flash® to create beautiful, resizable, and extremely compact navigation interfaces, technical illustrations, long-form animations, and other dazzling effects. Graphics and animation will scale based on the viewer's screen size, providing high-quality viewing.

The present invention generally comprises a multimedia interface for accessing the software application or website to create the custom bouquets, including bridal bouquets, Maid (Matron) of Honor, bridesmaids, flower girls, bride's toss bouquets, and the like.

FIG. 1 is a high level diagram of an exemplary computing system network on which the present invention may be implemented. The system 10 includes a web server 12 for storing web pages, and a client computer 16 capable of accessing the web pages on server 12. Server 12 may be any number of known computers, or network of computers, capable of hosting a website. Similarly, client 16 may be any number of known computers, or network of computers, capable of supporting a web browser. Server 12 and client 16 are coupled to one another via a network 14, such as the Internet. To retrieve a web page stored on server 12, the user of client 16 specifies a URL (uniform resource locator). The specified URL allows web-browsing software running on client 16 to initiate communication with server 12 and access the desired HTML page, which a browser interprets and displays on client 16.

As previously discussed, to view a web page on client 16, the user specifies, via a URL, the location of the desired web page. The browser on client 16 then retrieves the HTML file for the specified web page, interprets the file, and displays it as a web page.

In a preferred embodiment, the present invention operates similar to standard interactive web sites with the exception of having the additional unique features of the invention. Preferably, the invention is operated as an interactive multimedia website to provide the different features of the invention.

Figure 2:
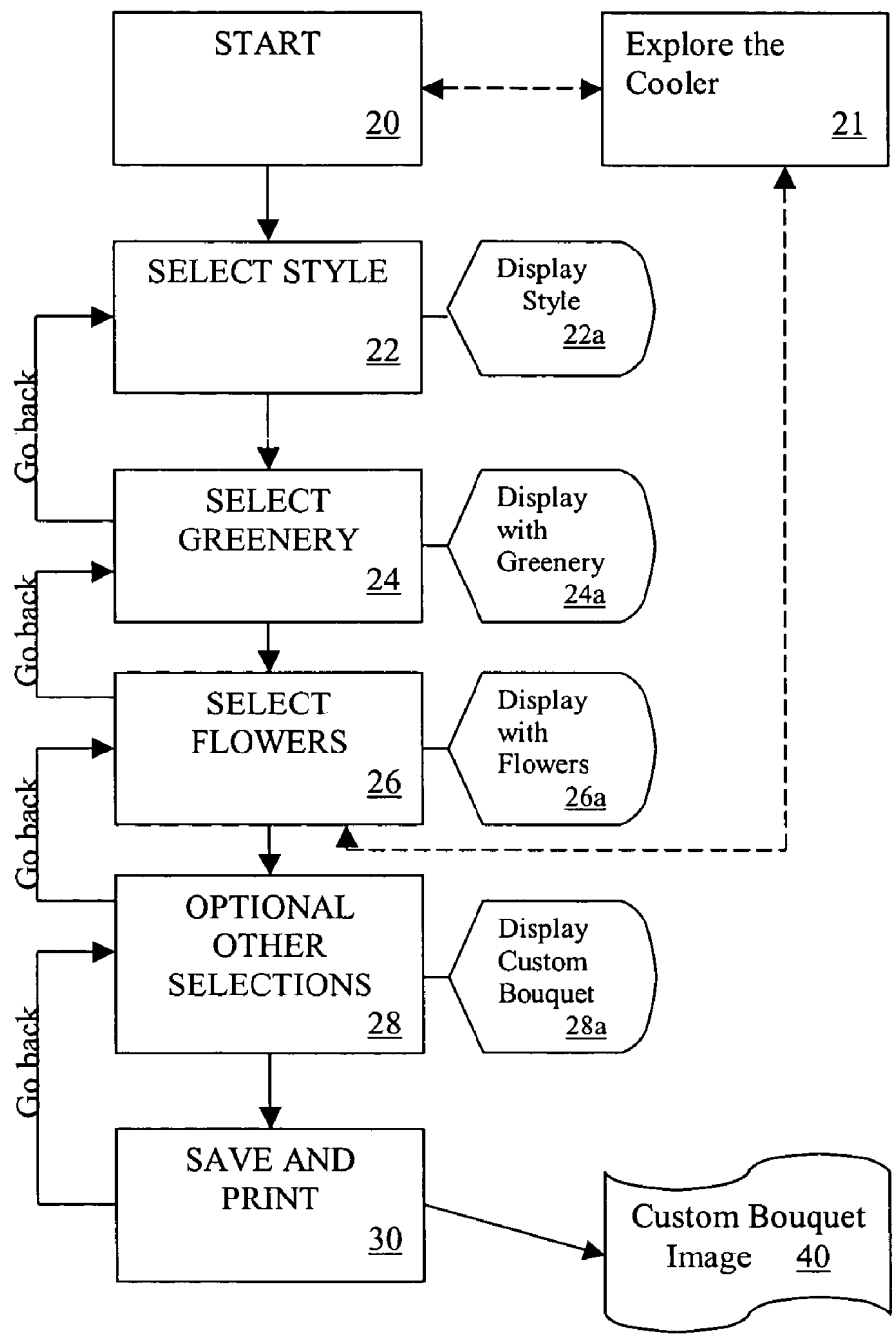
FIG. 2 is a flow chart of the operation of an embodiment of the invention.
Figure 3A:
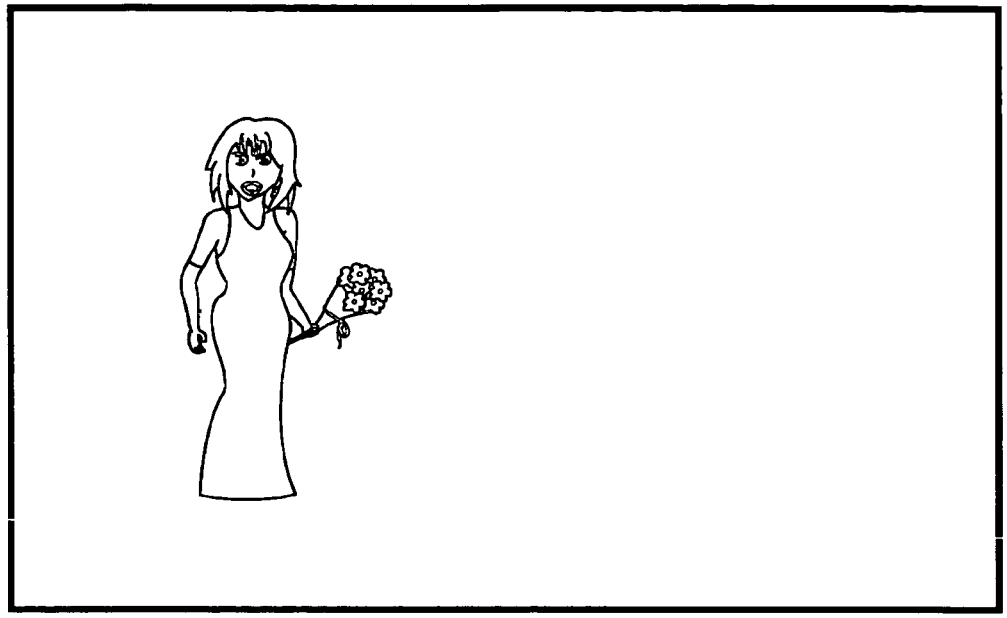
FIGS. 3a-3d are sample screen images demonstrating an embodiment of the invention.
Figure 3B:
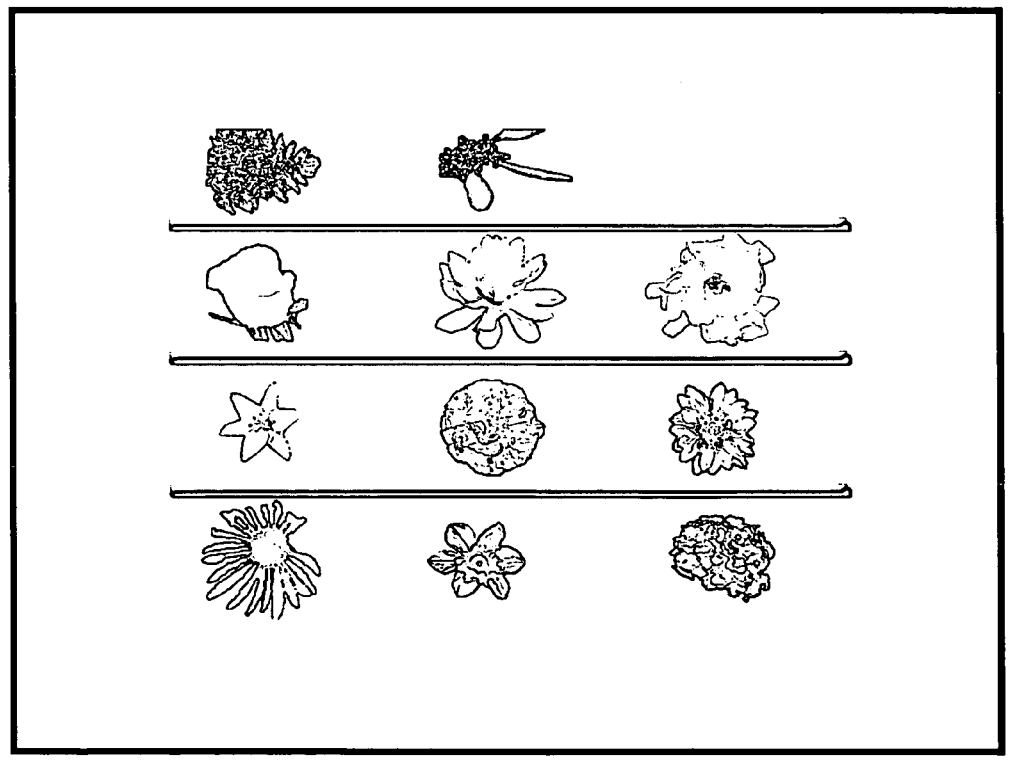

Turning now to FIG. 2, a flow chart of the operation of an embodiment of the invention is shown. The operation preferably begins with STEP 20—START. This may comprise an introduction, directions, login, and the like. In a preferred embodiment, a multimedia, animated bride provides a visual and audible introduction as shown in FIG. 3a. The animated bride may also provide instructions and help, including providing instructions and assistance during the transitions between steps. An option to explore the flower cooler STEP 21 is available. The flower cooler allows the user to associate a visual depiction of any named type of flower, and vice-versa, which would be useful in various circumstances. For example, the user may have an interest in a particular flower through its meaning, but only knows the name of the flower. A sample screen shot of the flower cooler is illustrated in FIG. 3b.

In STEP 22—SELECT STYLE, the user selects the style/shape of greenery for the bouquet from a plurality of images. For example, Cascade: Large, tear-shaped arrangement in which flowers spill downward; Nosegay: Round in shape, in a tightly bound cluster of small flowers; Arm Bouquet: Crescent shape designed to be cradled in one arm; Hand-Tied Bouquet: A simple cluster of long stems, tied with a ribbon; Spray Bouquet: Usually a triangular shaped cluster of flowers; and the like. The selected style is displayed in STEP 22a. The user can select and deselect the various styles, each time being able to view the selection. Preferably, the display includes an image of a bride holding the bouquet for a more realistic presentation.

Figure 3C:
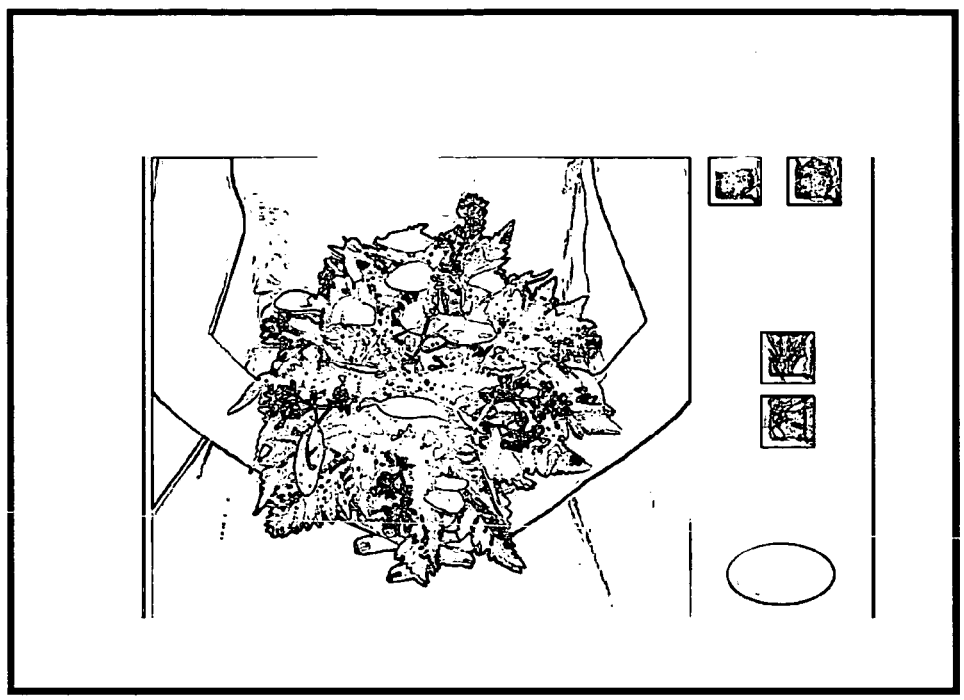

In STEP 24—SELECT GREENERY, the user selects the greenery for the bouquet from a plurality of images. As greenery is selected and de-selected, the display is updated accordingly (STEP 24a). A sample screen shot of the greenery style and type selection is shown in FIG. 3c. The image of the selected greenery is shown as well as numerous icons for selecting and de-selecting greenery choices.

Figure 3D:
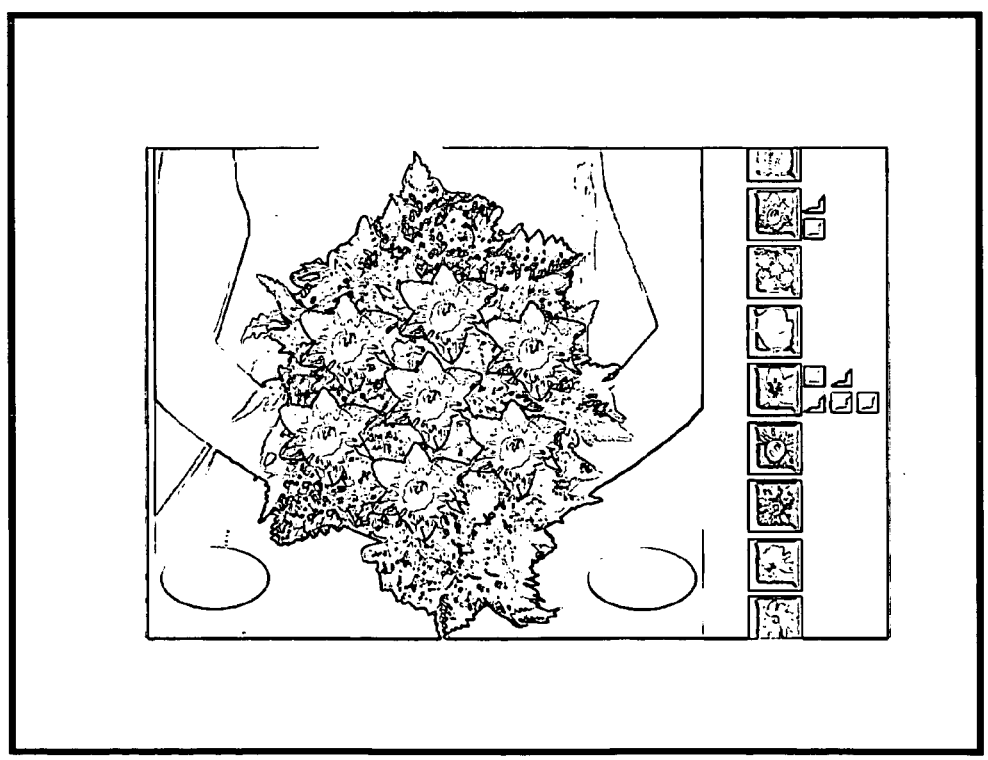

In STEP 26—SELECT FLOWERS, the user selects the flowers for the bouquet from a plurality of images. As flowers are selected and de-selected, the display is updated accordingly (STEP 26a). A sample screen shot of the flower selection is shown in FIG. 3d. The image of the selected flowers is shown as well as numerous icons for selecting and de-selecting flower choices. The flowers are arranged in the bouquet in a manner suitable for the selection(s) made. Should different colors be available for the flowers, the user may select a specific color. In a preferred embodiment, the displayed arrangement allows multiple types of flowers to be chosen for the bouquet without unnecessary obstruction or overlapping of the flowers. An option to explore the flower cooler STEP 21 is available.

In STEP 28—OPTIONAL OTHER SELECTIONS, the program may provide for other options, such as smaller background greenery/flowers, bows, or other decorative items to be included in the bouquet. The user selects the options for the bouquet from a plurality of images. As options are selected and de-selected, the display is updated accordingly (STEP 28a).

Figure 4:
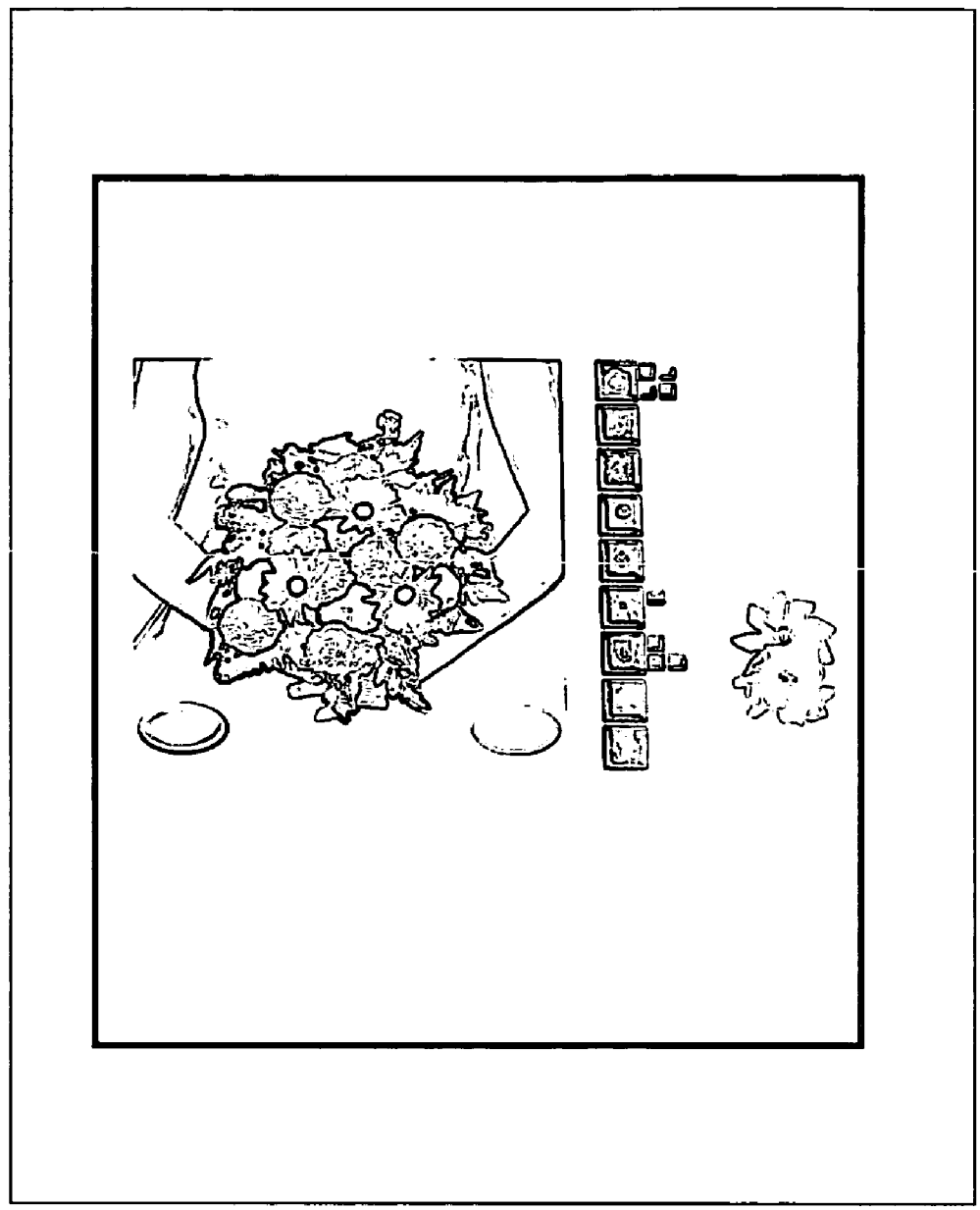
FIG. 4 is a sample output document produced by an embodiment of the invention.

At any time during the process, the user may go back to a previous step or start over. Once the user is satisfied with the selection, the resulting bouquet image 40 may be saved and/or output to a printing device or transmitted by other means (email, and the like). The user can then take or send the image to a florist as a guide for creating the actual fresh bouquet. The saved/printed image may include other information useful to the user and/or florist, such as flower names, prices, availability, arrangement recommendations, supplemental wedding decorating ideas and suggestions, and the like. A sample printout is provided in FIG. 4.

It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, it should be understood that the invention is not limited to the particular hardware designs, software designs, communications protocols, performance parameters, or application-specific functions disclosed herein.

The invention can also be embodied as computer readable code on a computer readable medium. The computer readable medium is any data storage device that can store data, which thereafter can be read by a computer system. Examples of computer readable medium include read-only memory, random-access memory, CD-ROMs, DVDs, magnetic tape, optical data storage devices. The computer readable medium can also be distributed over network coupled computer systems so that the computer readable code is stored and executed in a distributed fashion.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method for designing a custom bouquet via a graphical user interface comprising:
    providing a graphical user interface having at least two distinct areas comprising an interactive area and a display area, wherein the interactive area comprises selectable bouquet item icons for allowing a user to select respective different bouquet items or de-select previously selected bouquet items;
    providing an animated figure for giving instructions and help to the user;
    providing a selectively displayed separately browseable simulated flower cooler comprising visual depictions of flowers and corresponding flower names for user reference;
    outputting information corresponding to a bouquet design image custom created by the user after implementing the following steps:
    (a) providing a first set of selectable bouquet style item icons in the interactive area corresponding to bouquet style items;
        for each bouquet style item icon that a select command is received, realistically displaying the respective bouquet style item on the bouquet design image in the display area along with an image of a bride;
        for each bouquet style item icon that a de-select command is received, deleting the respective bouquet style item on the bouquet design image in the display area;
    (b) providing a second set of selectable bouquet greenery item icons in the interactive area corresponding to bouquet greenery items to be added to the previously selected bouquet style item;
        for each bouquet greenery item icon that a select command is received, realistically displaying the respective bouquet greenery item on the bouquet design image in the display area along with the image of the bride;
        for each bouquet greenery item icon that a de-select command is received, deleting the respective bouquet greenery item on the bouquet design image in the display area;
    (c) providing a third set of selectable bouquet flower item icons in the interactive area corresponding to bouquet flower items to be added to the previously selected bouquet style item and bouquet greenery items;
        for each bouquet flower item icon that a select command is received, realistically displaying the respective bouquet flower item on the bouquet design image in the display area along with the image of the bride, wherein the respective bouquet flower item is arranged in a predetermined manner to limit obstruction of a previously selected bouquet flower item;
        for each bouquet flower item icon that a de-select command is received, deleting the respective bouquet flower item on the bouquet design image in the display area.

2. The method of claim 1, wherein the information corresponding to the bouquet design image is output as electronic media.

3. The method of claim 2, further comprising communicating the electronic media to a florist for creation of an actual bouquet corresponding to the bouquet design image.

4. The method of claim 1, wherein the information corresponding to the bouquet design image is output as printed media.

5. The method of claim 4, further comprising providing the printed media to a florist for creation of an actual bouquet corresponding to the bouquet design image.

6. The method of claim 1, further comprising a user selectable color icon for one or more respective bouquet flower items.

7. The method of claim 1, further comprising the step (d) of
    providing a forth set of selectable bouquet decorative item icons in the interactive area corresponding to bouquet decorative items;
        for each bouquet decorative item icon that a select command is received, realistically displaying the respective bouquet decorative item on the bouquet design image in the display area along with the image of the bride;
        for each bouquet decorative item icon that a de-select command is received, deleting the respective bouquet decorative item on the bouquet design image in the display area.

8. A computer system for designing a custom bouquet via a graphical user interface comprising:
    a graphical user interface having at least two distinct areas comprising an interactive area and a display area, wherein the interactive area comprises selectable bouquet item icons for allowing a user to select respective different bouquet items or de-select previously selected bouquet items;
    an animated figure multimedia interface for giving instructions and help to the user;
    a database for storing data relative to a separately browseable simulated flower cooler comprising visual depictions of flowers and corresponding flower names for user reference and for storing bouquet items to be displayed with the image of the bouquet, the items linked to respective icons;
    a processor for outputting information corresponding to a bouquet design image custom created by the user after the processor implements the following steps:

(a) providing a first set of selectable bouquet style item icons in the interactive area corresponding to bouquet style items;

for each bouquet style item icon that a select command is received, realistically displaying the respective bouquet style item on the bouquet design image in the display area along with an image of a bride;

for each bouquet style item icon that a de-select command is received, deleting the respective bouquet style item on the bouquet design image in the display area;

(b) providing a second set of selectable bouquet greenery item icons in the interactive area corresponding to bouquet greenery items to be added to the previously selected bouquet style item;

for each bouquet greenery item icon that a select command is received, realistically displaying the respective bouquet greenery item on the bouquet design image in the display area along with the image of the bride;

for each bouquet greenery item icon that a de-select command is received, deleting the respective bouquet greenery item on the bouquet design image in the display area;

(c) providing a third set of selectable bouquet flower item icons in the interactive area corresponding to bouquet flower items to be added to the previously selected bouquet style item and bouquet greenery items;

for each bouquet flower item icon that a select command is received, realistically displaying the respective bouquet flower item on the bouquet design image in the display area along with the image of the bride, wherein the respective bouquet flower item is arranged in a predetermined manner to limit obstruction of a previously selected bouquet flower item;

for each bouquet flower item icon that a de-select command is received, deleting the respective bouquet flower item on the bouquet design image in the display area.

9. A computer readable storage media device containing program instructions for designing a custom bouquet via a graphical user interface comprising:

first computer instructions for providing a graphical user interface having at least two distinct areas comprising an interactive area and a display area, wherein the interactive area comprises selectable bouquet item icons for allowing a user to select respective different bouquet items or de-select previously selected bouquet items;

second computer instructions for providing an animated figure for giving instructions and help to the user;

third computer instructions for providing a selectively displayed separately browseable simulated flower cooler comprising visual depictions of flowers and corresponding flower names for user reference;

fourth computer instructions for outputting information corresponding to a bouquet design image custom created by the user after implementing the following steps with fifth computer instructions for:

(a) providing a first set of selectable bouquet style item icons in the interactive area corresponding to bouquet style items;

for each bouquet style item icon that a select command is received, realistically displaying the respective bouquet style item on the bouquet design image in the display area along with an image of a bride;

for each bouquet style item icon that a de-select command is received, deleting the respective bouquet style item on the bouquet design image in the display area;

(b) providing a second set of selectable bouquet greenery item icons in the interactive area corresponding to bouquet greenery items to be added to the previously selected bouquet style item;

for each bouquet greenery item icon that a select command is received, realistically displaying the respective bouquet greenery item on the bouquet design image in the display area along with the image of the bride;

for each bouquet greenery item icon that a de-select command is received, deleting the respective bouquet greenery item on the bouquet design image in the display area;

(c) providing a third set of selectable bouquet flower item icons in the interactive area corresponding to bouquet flower items to be added to the previously selected bouquet style item and bouquet greenery items;

for each bouquet flower item icon that a select command is received, realistically displaying the respective bouquet flower item on the bouquet design image in the display area along with the image of the bride, wherein the respective bouquet flower item is arranged in a predetermined manner to limit obstruction of a previously selected bouquet flower item;

for each bouquet flower item icon that a de-select command is received, deleting the respective bouquet flower item on the bouquet design image in the display area.

* * * * *

UNITED STATES PATENT AND TRADEMARK OFFICE
CERTIFICATE OF CORRECTION

PATENT NO. : 7,337,413 B1  
APPLICATION NO. : 10/985651  
DATED : February 26, 2008  
INVENTOR(S) : Laurie Reesh et al.

It is certified that error appears in the above-identified patent and that said Letters Patent is hereby corrected as shown below:

At Title Page Item (73) Assignee, please delete "I Do and So Can You, Inc." and insert therefor --I Do And You Can Too, Inc.--.

Signed and Sealed this

Eighteenth Day of May, 2010

David J. Kappos
*Director of the United States Patent and Trademark Office*